United States Patent
Akiyama et al.

(10) Patent No.: US 7,321,713 B2
(45) Date of Patent: Jan. 22, 2008

(54) SILICON BASED ON-CHIP PHOTONIC BAND GAP CLADDING WAVEGUIDE

(75) Inventors: Shoji Akiyama, Brighton, MA (US); Xiaoman Duan, Amesbury, MA (US); Lionel C. Kimerling, Concord, MA (US); Yasha Yi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/230,024

(22) Filed: Sep. 19, 2005

(65) Prior Publication Data

US 2006/0088265 A1    Apr. 27, 2006

Related U.S. Application Data

(60) Provisional application No. 60/643,196, filed on Jan. 12, 2005, provisional application No. 60/611,227, filed on Sep. 17, 2004.

(51) Int. Cl.
*G02B 6/10* (2006.01)

(52) U.S. Cl. .................................... 385/129
(58) Field of Classification Search .............. None
See application file for complete search history.

(56) References Cited

U.S. PATENT DOCUMENTS

| 6,807,353 | B1 * | 10/2004 | Fleming et al. | 385/132 |
| 2004/0252957 | A1 * | 12/2004 | Schmidt et al. | 385/131 |
| 2004/0264903 | A1 * | 12/2004 | Dridi et al. | 385/129 |

OTHER PUBLICATIONS

"Antiresonant reflecting optical waveguides in $SiO_2$-Si multilayer structures"; Duguay et al.; 1986 American Institute of Physics; Applied Physics Letter 49, Jul. 7, 1986; pp. 13-15.
Yi et al., "Low loss Photonic Crystal Cladding Waveguide with Large Photonic Band Gap" Mat. Res. Soc. Symp. Proc. vol. 797, 2004 Materials Research Society, pp. W3.4.1-W3.4.5, no month.
Kimerling et al., "Monolithic Silicon Microphotonics" Silicon Photonics, yopincs Appl. Phys., 2004, 94, pp. 89-119, no month.
Yin et al., "Integrated ARROW waveguides with hollow cores," Optics Express, Jun. 14, 2004, vol. 12, No. 12, pp. 2710-2715.

* cited by examiner

*Primary Examiner*—Kevin S Wood
*Assistant Examiner*—Mike Stahl
(74) *Attorney, Agent, or Firm*—Gauthier & Connors LLP

(57) ABSTRACT

A waveguide structure includes a core structure that has low index materials. A photonic crystal cladding structure utilized in guiding optical modes in the core. The photonic crystal cladding structure includes alternating layers of Si and $Si_3N_4$.

14 Claims, 8 Drawing Sheets

SILICON BASED ON-CHIP PHOTONIC BAND GAP CLADDING WAVEGUIDE

PRIORITY INFORMATION

This application claims priority from provisional applications Ser. No. 60/643,196 filed Jan. 12, 2005, which is incorporated herein by reference in its entirety, and Ser. No. 60/611,227 filed on Sep. 17, 2004, which is also incorporated herein by reference in its entirety.

This invention was made with government support under Grant Number. DMR-0213282, awarded by the NSF. The government has certain rights in the invention.

BACKGROUND OF THE INVENTION

The invention relates to the field of waveguides, and in particular to an on-chip silicon-based Photonic Crystal (PC) cladded waveguide.

Recently, interest in guiding light within low-index materials (including air) has increased, with new devices that use a photonic band gap (PBG) or Bragg reflection to confine light. Specific examples include 2D photonic crystal fibers and ARROW waveguides. Another example, the onmiguide fiber, uses high index contrast concentric dielectric layers to enhance the mode confinement in a relatively simple structure. It is difficult to fabricate this structure on a silicon chip. However, the same principle of using 1D omnidirectional mirrors can be applied to an alternative structure that can be fabricated with current microelectronics technology processes (CMOS compatible processes).

SUMMARY OF THE INVENTION

According to one aspect of the invention, there is provided a waveguide structure. The waveguide structure includes a core structure that has low index materials. A photonic crystal cladding structure is utilized in guiding optical modes in the core. The photonic crystal cladding structure includes alternating layers of Si and $Si_3N_4$.

According to another aspect of the invention, there is provided a method of forming a waveguide structure. The method includes forming a core structure that has low index materials. Furthermore, the method includes forming a photonic crystal cladding structure utilized in guiding optical modes in the core. The photonic crystal cladding structure includes alternating layers of Si and $Si_3N_4$.

DETAILED DESCRIPTION OF THE INVENTION

An on-chip silicon-based Photonic Crystal (PC) cladded waveguide is designed with low refractive index material for the core, and stratified high index contrast dielectric layers as the cladding. Due to the high index contrast of these materials with each other, they have a large photonic band gap, and may act as omnidirectional reflectors, which means light of all incident angles and polarizations is reflected within a range of wavelengths (e.g., near 1550 nm). In contrast with an index-guided waveguide, it is possible to confine light to a low index core (possibly air). The high index contrast allows the cladding thickness to be less than 2 microns, which is much thinner than the conventional silica optical bench waveguide. This structure can also be used to efficiently transmit light about bends much tighter than found in low index contrast index-guided waveguides.

Figure 1:
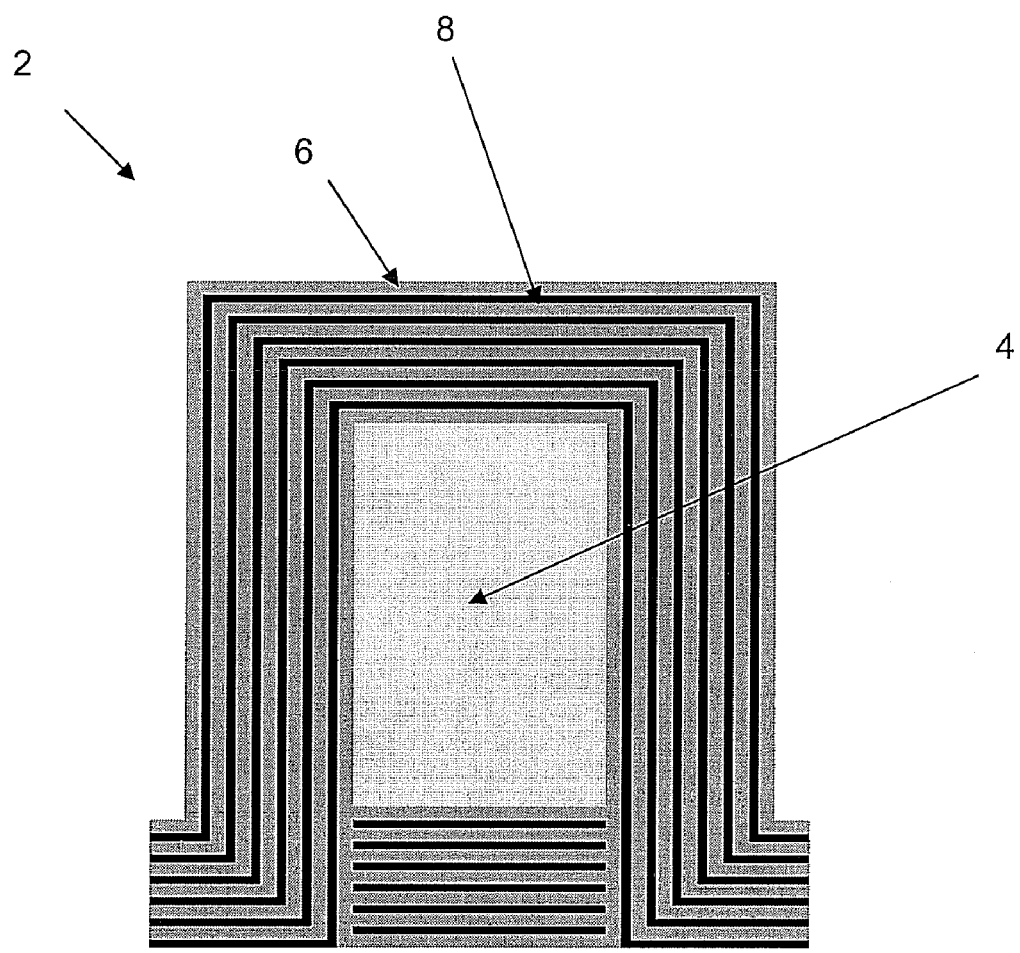
FIG. 1 is a schematic diagram that illustrates a Photonic Crystal (PC) cladded waveguide.

An on-chip PC cladded waveguide configuration 2 is illustrated in FIG. 1. The inventive on-chip PC waveguide is designed with a low index core layer 4 of $SiO_2$ (n=1.46) and a high index contrast cladding consisting of pairs of layers 6, 8 of Si (n=3.5) and $Si_3N_4$ (n=2.0), which each have a quarter wavelength thickness at the target wavelength of 1550 nm. It combines the ease of layer-by-layer fabrication (as discussed below) with low losses that are associated with the presence of a highly reflective mirror on all sides of the core. Guided modes can be found within the PBG of the 1D $Si/Si_3N_4$ PC. They can be predicted by comparison with a waveguide made from perfectly reflecting metallic walls.

Figure 2:
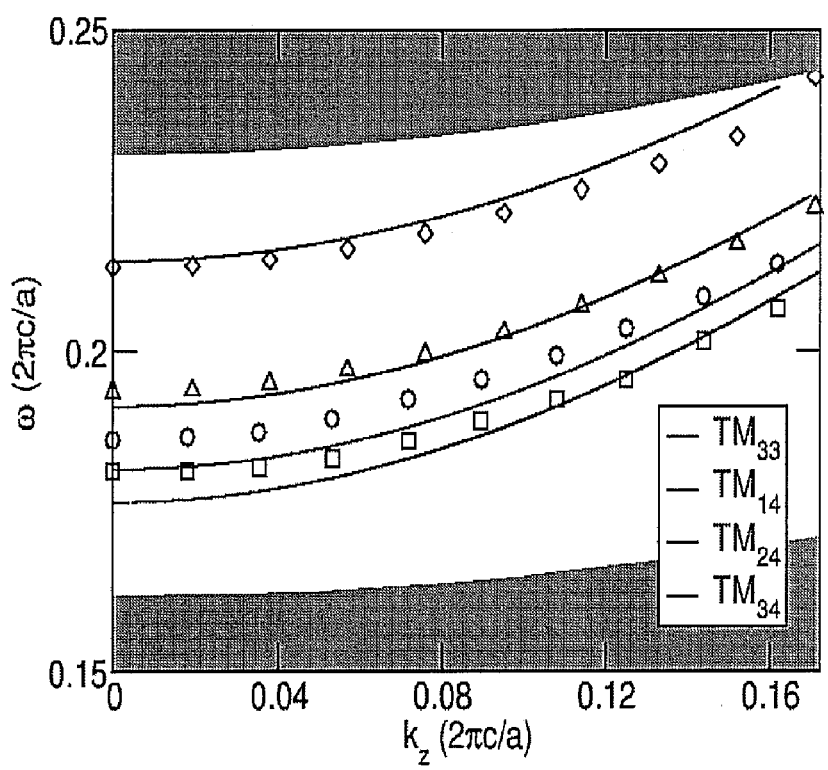
FIG. 2 is a graph demonstrating the dispersion relation for modes within the band gap of an on-chip PC cladded waveguide.

The dispersion (relation between frequency and axial wavevector) for modes within the band gap of an on-chip PBG waveguide for a core size of 2.5 microns square is shown in FIG. 2. The dispersion of the dielectric waveguide matches pretty well with the metallic waveguide, except for one key difference, which is the phase shift associated with reflections from the dielectric surface. For a perfect metal, the phase shift will always be $\pi$, but for a dielectric reflector, it will change with frequency, and generally be less than $\pi$ for the lower half of the gap and greater than $\pi$ for the upper half of the gap.

Qualitatively, that leads to a prediction that modes for the metallic waveguide are "pushed" toward the center of the gap. Another consideration is power loss in this structure. Losses will decrease with increasing core size according to a power law, and decrease exponentially with the number of cladding layers (until other loss mechanisms begin to dominate). Based on theoretical considerations, it seems that the $TE_{01}$ mode should be capable of achieving especially low losses due to its insensitivity to core size in one direction (which allows for the lowest loss in a given modal area).

The on-chip PC waveguide is fabricated with a CMOS-compatible process: the Low Pressure Chemical Vapor Deposition (LPCVD) is used to deposit the Si and $Si_3N_4$ cladding layers and the Low Temperature Oxide (LTO) method is used to make the oxide core. On a 6" Si chip, the 110 nm Si layer is deposited using the LPCVD method at a temperature of 625° C.; the 194 nm $Si_3N_4$ layer is deposited using LPCVD at a temperature of 775° C. After the deposition of the bottom six and a half 1D PBG crystal layers, one can use the LTO method to deposit $SiO_2$ at 450° C., followed by a 900° C. anneal, to obtain a high quality oxide layer with a thickness between 4 and 6 microns. Lithography and high-density plasma etching is then used to define the waveguide core geometry. Finally, the same deposition method (LPCVD) is used to finish the top six and a half Si/Si3N4 1D PC layers.

Figure 3A:
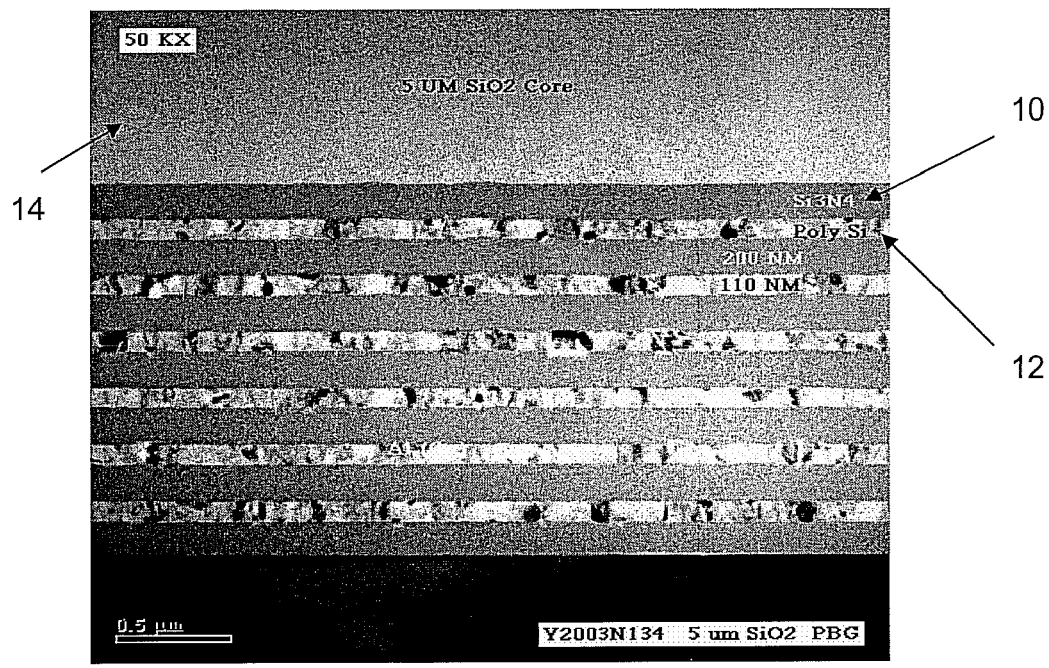
FIG. 3A is a TEM image of cladding pairs including the bottom cladding PBG layers ($Si/Si_3N_4$) and $SiO_2$ core.
Figure 3B:
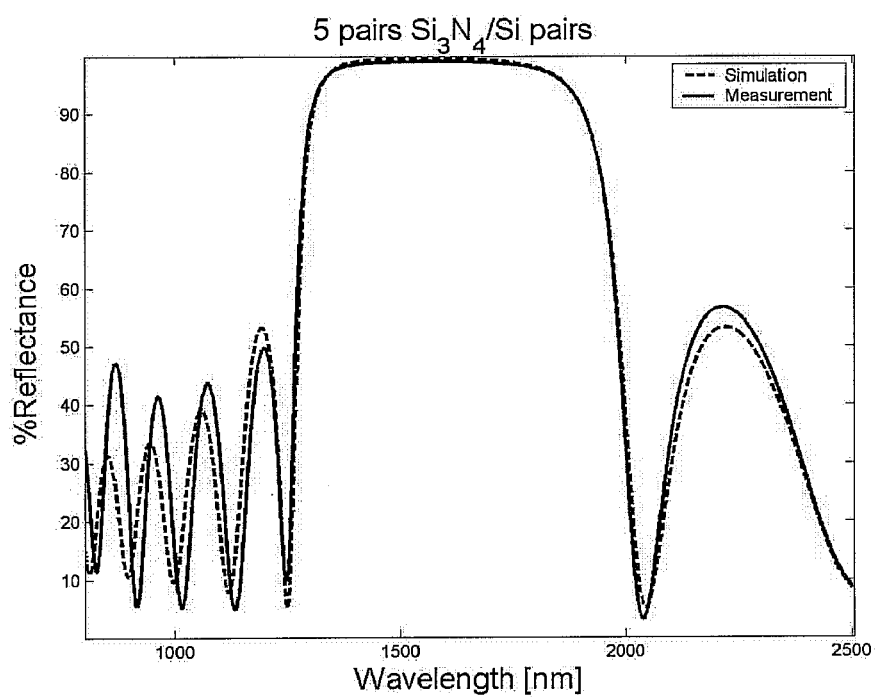
FIG. 3B is a graph illustrating the measurement and simulation on absolute reflectivity of 5 pairs $Si/Si_3N_4$ layers.

FIG. 3A is a TEM picture of a 1D PC slab fabricated using this technique, comprising of 7 layers 10 of $Si_3N_4$ and 6 layers 12 of poly-Si arranged in a periodic structure, with top $SiO_2$ layer 14 and on Si substrate 16. Clearly, the LPCVD deposition method is able to accurately control the thickness and flatness of the Si and $Si_3N_4$ layers 10, 12, both of which are important to prevent scattering losses. The high index contrast of the Si and $Si_3N_4$ pairs 10, 12 gives rise to a large PBG and high reflectivity (greater than 99%) for only a few bilayers. This is illustrated in FIG. 3B, where the measured absolute reflectivity of five $Si/Si_3N_4$ bilayers 10, 12 is compared with a numerical calculation of the reflectivity of the ideal structure, using the transfer matrix method. The measurement and calculation are in very good agreement with each other, most importantly in the stop band, which extends from 1200 nm to 2000 nm.

Figure 4A:
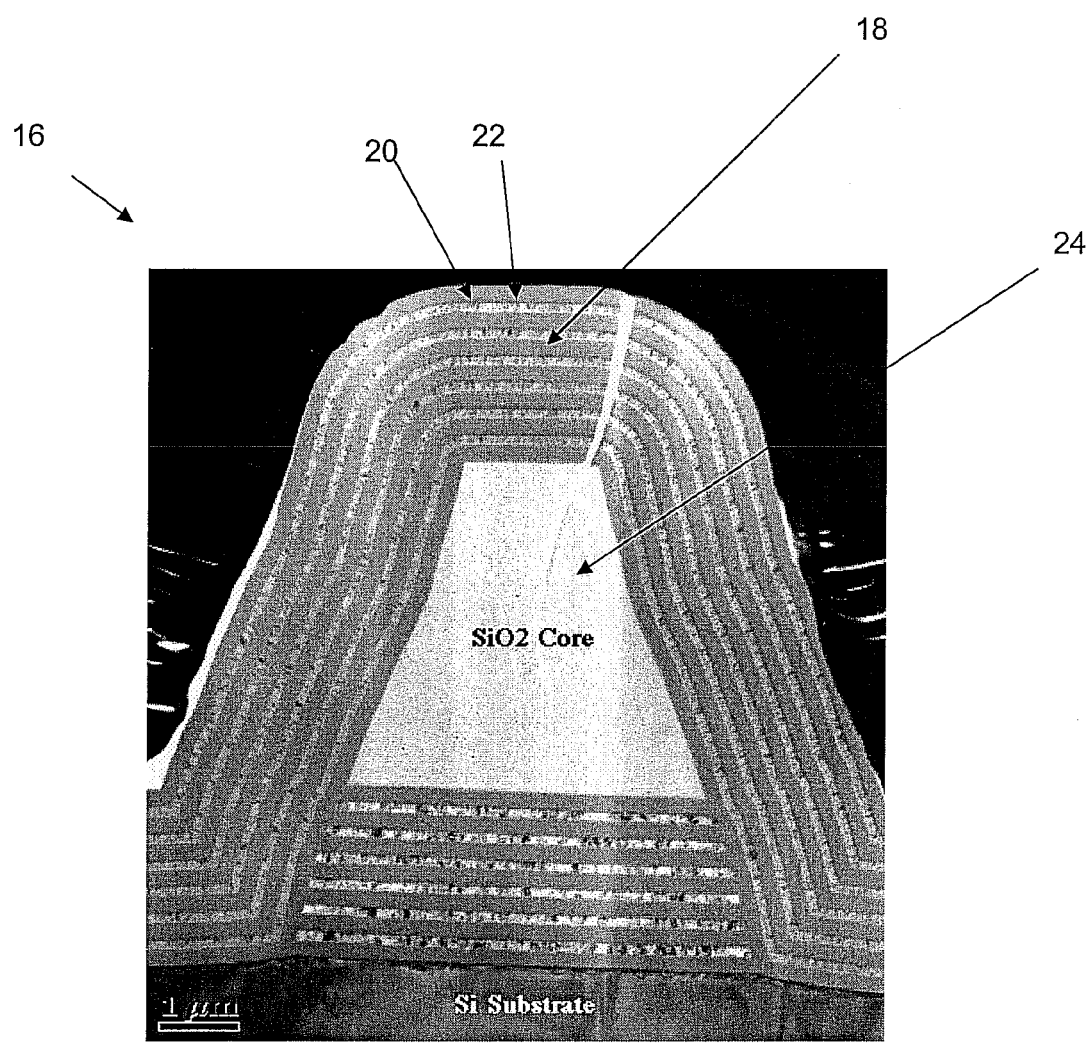
FIG. 4A is a TEM image of the fabricated PC cladded channel waveguide.
Figure 4B:
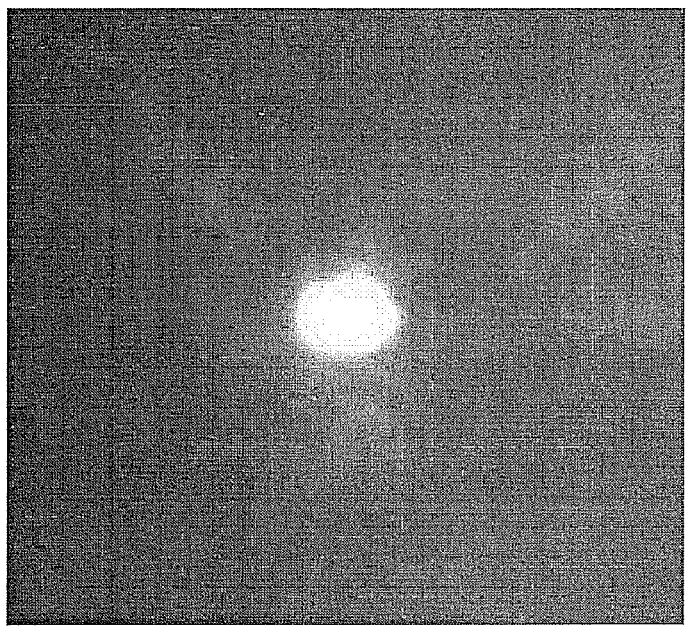
FIG. 4B The guided spot from the PC cladded channel waveguide.

A TEM picture of the final product, the fabricated on-chip PC channel waveguide 16, is shown in FIG. 4A. For the top PC cladding layers 18, each individual Si and $Si_3N_4$ layer 20, 22 is smooth, even at the curved surface, which shows the high quality of LPCVD's conformal step coverage. From FIG. 4A, one can conclude that CMOS compatible high and low index materials have good thermal and mechanical properties. The on-chip PC cladded waveguide loss is measured at 1550 nm using the following procedure: light from a tapered optical fiber is coupled into the waveguide 16, then the guided light emerging from the other end is focused with a lens and collected with a camera. FIG. 4B shows the guided spot imaged by the camera, which demonstrates the presence of one or more well-defined guided modes, which are primarily concentrated in the low index $SiO_2$ core 24, the waveguide loss is as low as 4 dB/cm for a typical cross section 6 µm×12 µm.

In this embodiment, a $SiO_2$ core 24 is used in the example of on-chip PC cladded channel waveguide structure. However, fabrication need not be restricted to $SiO_2$—a hollow core could also be fabricated with a slight change in the procedure. This so-called "core freedom" would give rise to multiple applications, for example, transmission of high intensity beams (e.g., for a $CO_2$ laser) through a hollow core without absorption or nonlinearity, or to trap light or even modify the rate of emission from an optically active material. It also has unique group-velocity dispersion characteristics, which can be modified with changes to the core. Finally, the on-chip PC cladded waveguide has the advantage of relatively small dimensions, including a tight turning radius compared to low-contrast index-guided fibers.

The inventive photonic crystal cladded waveguide is fully compatible to the current CMOS technology. Si and $Si_3N_4$ are deposited using LPCVD method and high quality PC cladding layers are realized. Light guiding in the low index core is demonstrated. A thin PBG cladding, made possible by the large index contrast between the Si and $Si_3N_4$ layers, indicates the advantage of this device over traditional silica optical bench waveguides.

Figure 5:
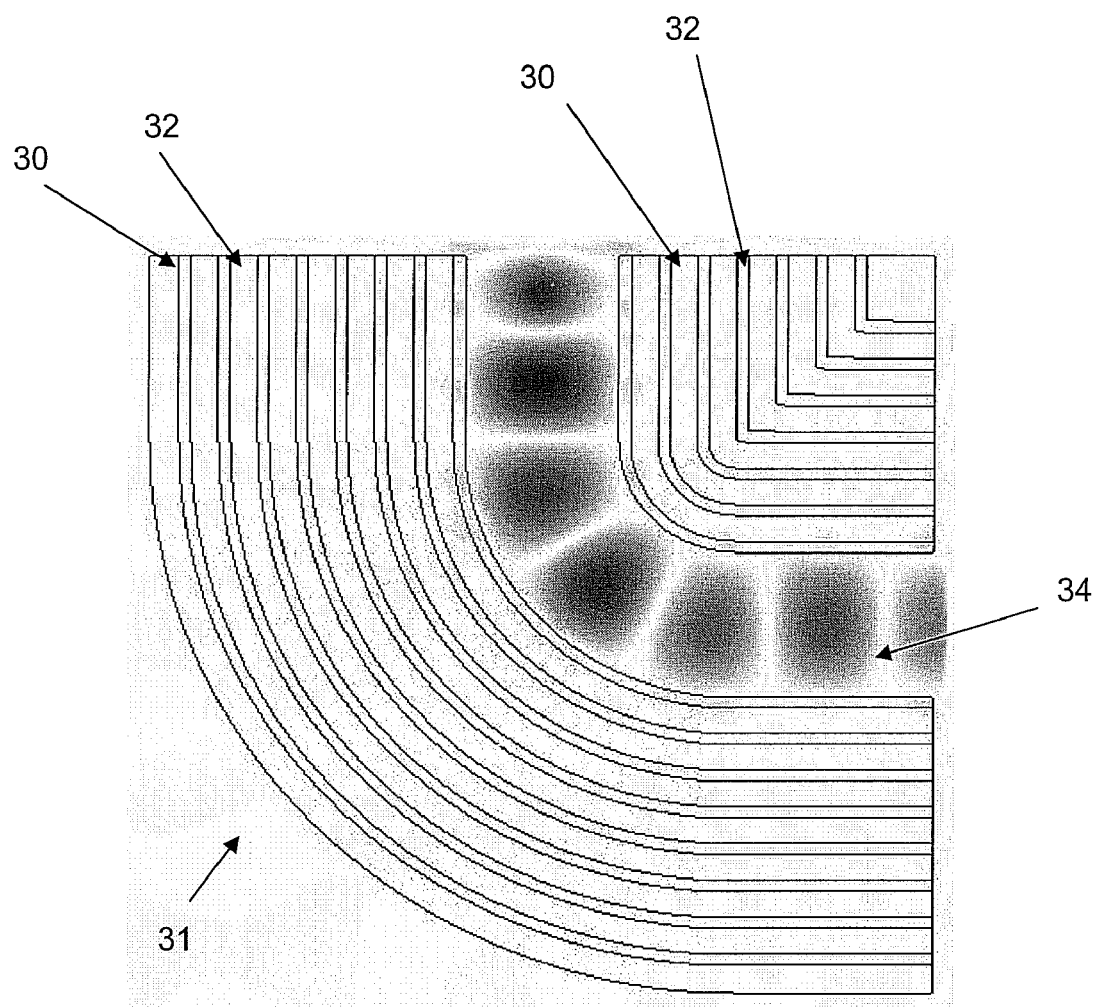
FIG. 5 is a schematic diagram of the channel waveguide for use in achieving a sharp bend with either low index core or hollow core propagation.

FIG. 5 illustrates a schematic diagram of the channel waveguide 31 for use in achieving a sharp bend. The channel waveguide 31 includes layers 30 of $Si_3N_4$ and layers 32 of poly-Si arranged in a periodic structure. Also, the channel waveguide 31 includes a core 34 which allow the propagation of optical modes thru the bent region. Note the core 34 can be either a low index core or hollow core for purposes of this embodiment. Note the layers 30, 32 are formed according in the same fashion as the layers 6, 8, 10, 12 described in FIGS. 1, 3A, and 3B. The layers 30, 32 are arranged to be high index contrast pairs.

Figure 6:
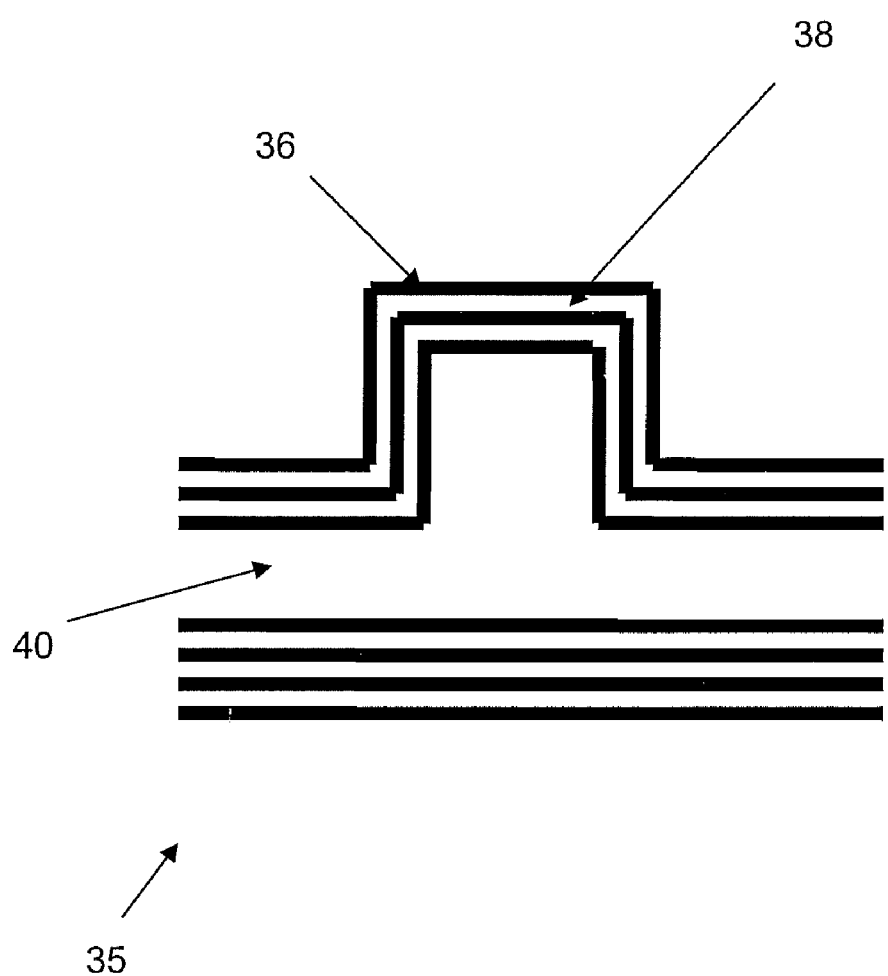
FIG. 6 is a schematic diagram of a PBG rib waveguide.

FIG. 6 illustrates a schematic diagram of a PBG rib waveguide 35. The rib waveguide 35 includes layers 38 of $Si_3N_4$ and layers 36 of poly-Si arranged in a periodic structure. Also, the rib waveguide 35 includes a core 40 which allow the propagation of optical modes. Note the core 40 can be a low index core for purposes of this embodiment. Note the layers 36, 38 are formed according in the same fashion as the layers 6, 8, 10, 12 described in FIGS. 1, 3A, and 3B. The layers 36, 38 are arranged to be high index contrast pairs.

Figure 7:
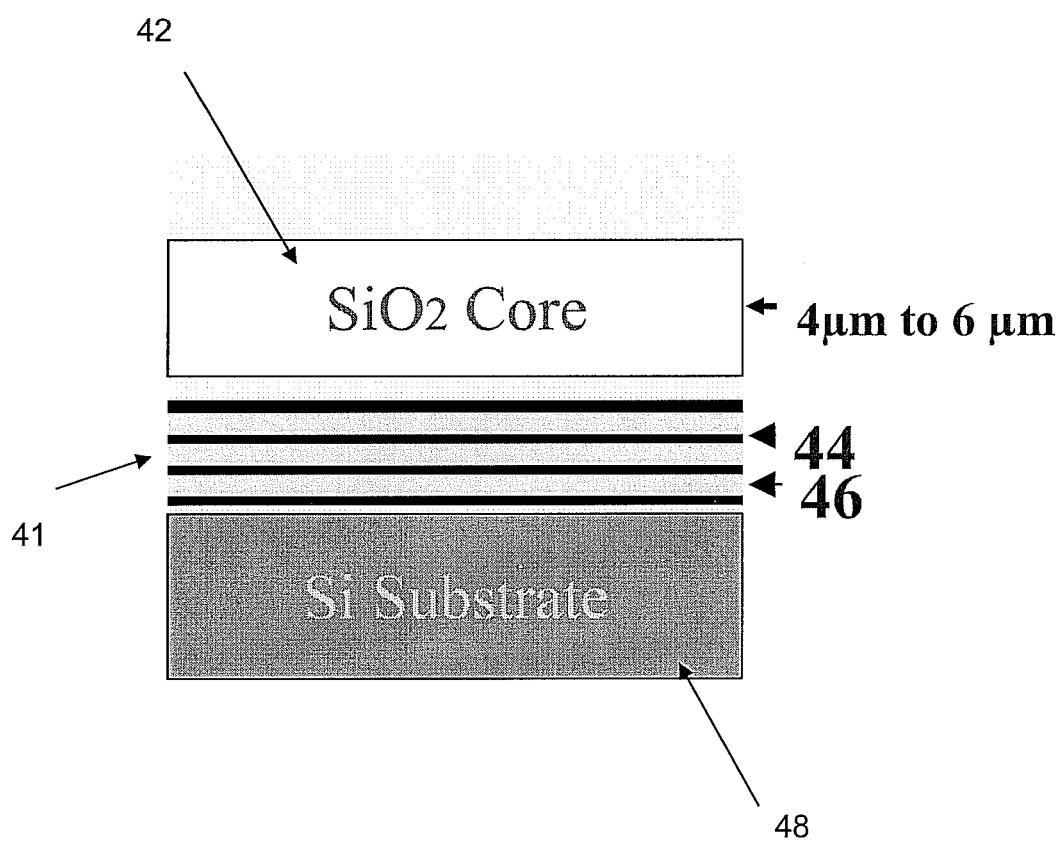
FIG. 7 is a schematic diagram of an asymmetric cladding.

FIG. 7 illustrates a schematic diagram of an asymmetric cladding 41 formed according to the invention. The asymmetric cladding 41 includes layers 46 of $Si_3N_4$ and layers 44 of poly-Si arranged in a periodic structure. Also, one side of the asymmetric cladding 41 includes a silicon dioxide core 42 which allow the propagation of optical modes. Note the core 42 can be another low index core for purposes of this embodiment and sized to between 2 µm and 4 µm. On the other side of the asymmetric cladding is a Si substrate 48. Note the layers 44, 46 are formed according in the same fashion as the layers 6, 8, 10, 12 described in FIGS. 1, 3A, and 3B. The layers 44, 46 are arranged to be high index contrast pairs.

Although the present invention has been shown and described with respect to several preferred embodiments thereof, various changes, omissions and additions to the form and detail thereof, may be made therein, without departing from the spirit and scope of the invention.

What is claimed is:

1. A waveguide structure comprising:
   a core structure comprising low index materials;
   a photonic crystal cladding structure utilized in guiding optical modes in said core, said photonic crystal cladding structure comprises alternating layers of Si and $Si_3N_4$, said cladding structure having a thickness of less than 2 microns, said waveguide structure being configured on-chip.

2. The waveguide structure of claim 1, wherein said core structure comprises silicon dioxide.

3. The waveguide structure of claim 1, wherein said core structure comprises a size of 2.5 microns square.

4. The waveguide structure of claim 1, wherein said photonic crystal cladding structure is fabricated with a CMOS-compatible process.

5. The waveguide structure of claim 1, wherein said alternating layers of Si and $Si_3N_4$ are deposited using LPCVD method.

6. The waveguide structure of claim 1, wherein said alternating layers comprises a large PBG and high reflectivity greater than 99%.

7. The waveguide structure of claim 1, wherein said core structure is fabricated using the Low Temperature Oxide (LTO) method.

8. A method of forming a waveguide structure comprising:
   forming a core structure comprising low index materials;
   forming a photonic crystal cladding structure utilized in guiding optical modes in said core, said photonic crystal cladding structure comprises alternating layers of Si and $Si_3N_4$, said cladding structure having a thickness of less than 2 microns, said waveguide structure being configured on-chip.

9. The method of claim 8, wherein said core structure comprises silicon dioxide.

10. The method of claim 8, wherein said core structure comprises a size of 2.5 microns square.

11. The method of claim 8, wherein said photonic crystal cladding structure is fabricated with a CMOS-compatible process.

12. The method of claim 8, wherein said alternating layers of Si and $Si_3N_4$ are deposited using LPCVD method.

13. The method of claim 8, wherein said alternating layers comprises a large PBG and high reflectivity greater than 99%.

14. The method of claim 8, wherein said core structure is fabricated using the Low Temperature Oxide (LTO) method.

* * * * *